(12) United States Patent
Teubner

(10) Patent No.: US 10,795,906 B1
(45) Date of Patent: Oct. 6, 2020

(54) TRANSACTION TRACKING

(71) Applicant: Hostbridge Technology, LLC, Stillwater, OK (US)

(72) Inventor: Russell W. Teubner, Stillwater, OK (US)

(73) Assignee: Hostbridge Technology, LLC, Stillwater, OK (US)

( * ) Notice: Subject to any disclaimer, the term of this patent is extended or adjusted under 35 U.S.C. 154(b) by 118 days.

(21) Appl. No.: 16/220,909

(22) Filed: Dec. 14, 2018

Related U.S. Application Data

(60) Provisional application No. 62/598,872, filed on Dec. 14, 2017.

(51) Int. Cl.

| | | |
|---|---|---|
| *G06F 16/00* | (2019.01) | |
| *G06F 16/25* | (2019.01) | |
| *H04L 29/08* | (2006.01) | |
| *G06F 9/54* | (2006.01) | |
| *G06F 9/46* | (2006.01) | |
| *G06F 40/169* | (2020.01) | |

(52) U.S. Cl.
CPC ............ *G06F 16/258* (2019.01); *G06F 9/466* (2013.01); *G06F 9/542* (2013.01); *G06F 16/252* (2019.01); *G06F 40/169* (2020.01); *H04L 67/12* (2013.01); *H04L 67/22* (2013.01)

(58) Field of Classification Search
CPC ...... G06F 16/258; G06F 40/169; G06F 11/34; G06F 16/252; G06F 16/30; G06F 17/30; G06F 9/542; G06F 9/466; H04L 67/22; H04L 43/00; H04L 67/12; H04L 12/2803; G06Q 30/00; G05B 19/485; A63F 13/30
See application file for complete search history.

(56) References Cited

U.S. PATENT DOCUMENTS

| | | | |
|---|---|---|---|
| 8,346,929 B1* | 1/2013 | Lai | G06Q 10/10 709/226 |
| 9,244,749 B2 | 1/2016 | Malkiman et al. | |
| 2002/0178299 A1* | 11/2002 | Teubner | G06F 9/546 719/320 |
| 2002/0194147 A1* | 12/2002 | Ricke | G06N 5/00 706/53 |
| 2003/0058277 A1* | 3/2003 | Bowman-Amuah | G06F 16/289 715/765 |
| 2005/0044197 A1* | 2/2005 | Lai | H04L 67/16 709/223 |
| 2005/0172018 A1* | 8/2005 | Devine | G06F 21/00 709/223 |
| 2007/0060367 A1 | 3/2007 | Heler | |
| 2008/0263365 A1* | 10/2008 | Aupperle | H04L 63/0815 713/185 |
| 2013/0191496 A1* | 7/2013 | Jones | H04L 47/70 709/217 |
| 2017/0034198 A1* | 2/2017 | Powers | H04L 63/20 |

OTHER PUBLICATIONS

Teubner, Russ, Bridging the SIEM Mainframe Gap, Blog at Wordpress.com, Oct. 23, 2017, pp. 1-2.

* cited by examiner

*Primary Examiner* — Anh Ly
(74) *Attorney, Agent, or Firm* — McAfee & Taft

(57) ABSTRACT

Disclosed are methods for tracking consumer transactions from a non-mainframe environment into a mainframe environment. The methods provide for carryover of consumer data from the non-mainframe environment into a mainframe environment.

19 Claims, 7 Drawing Sheets

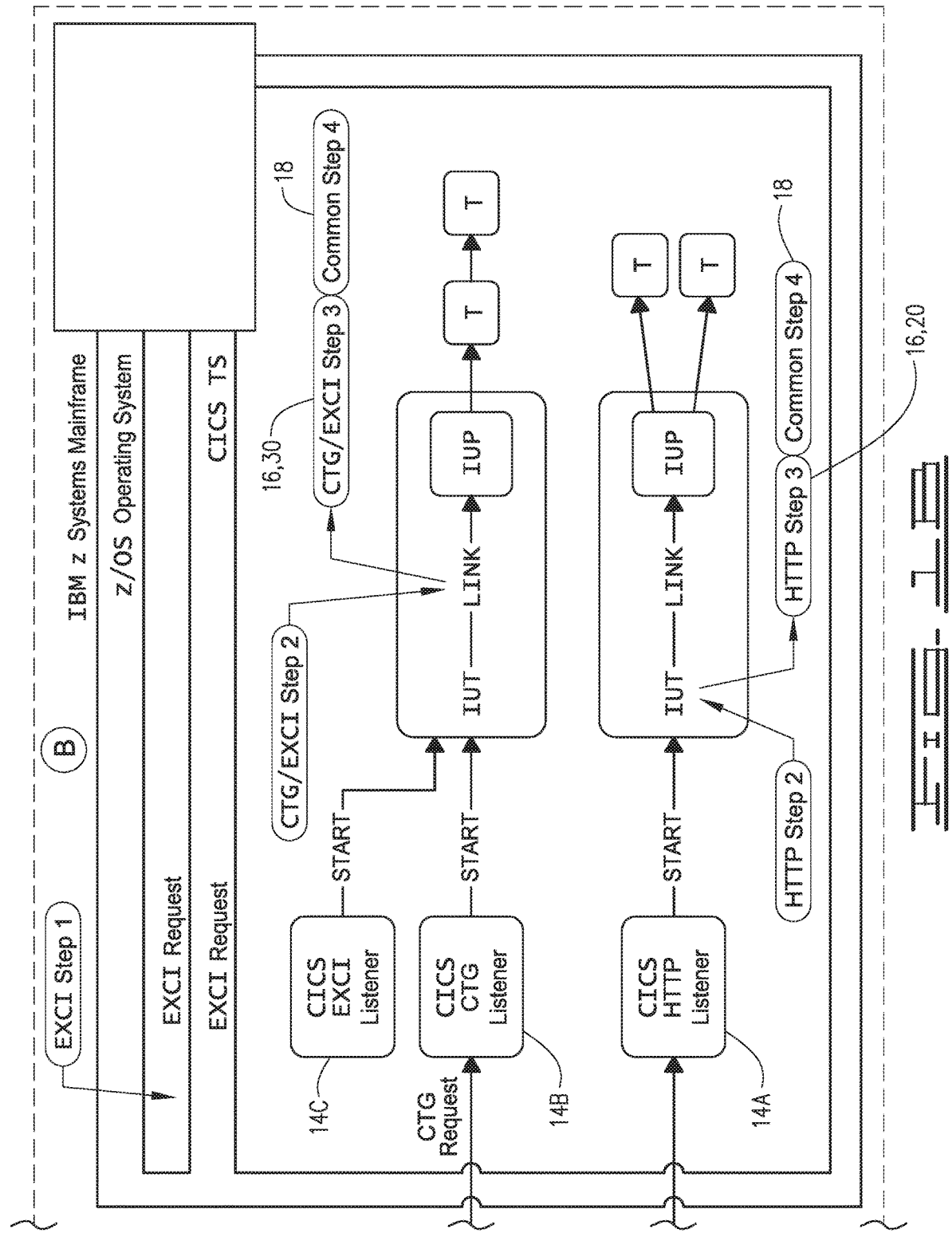

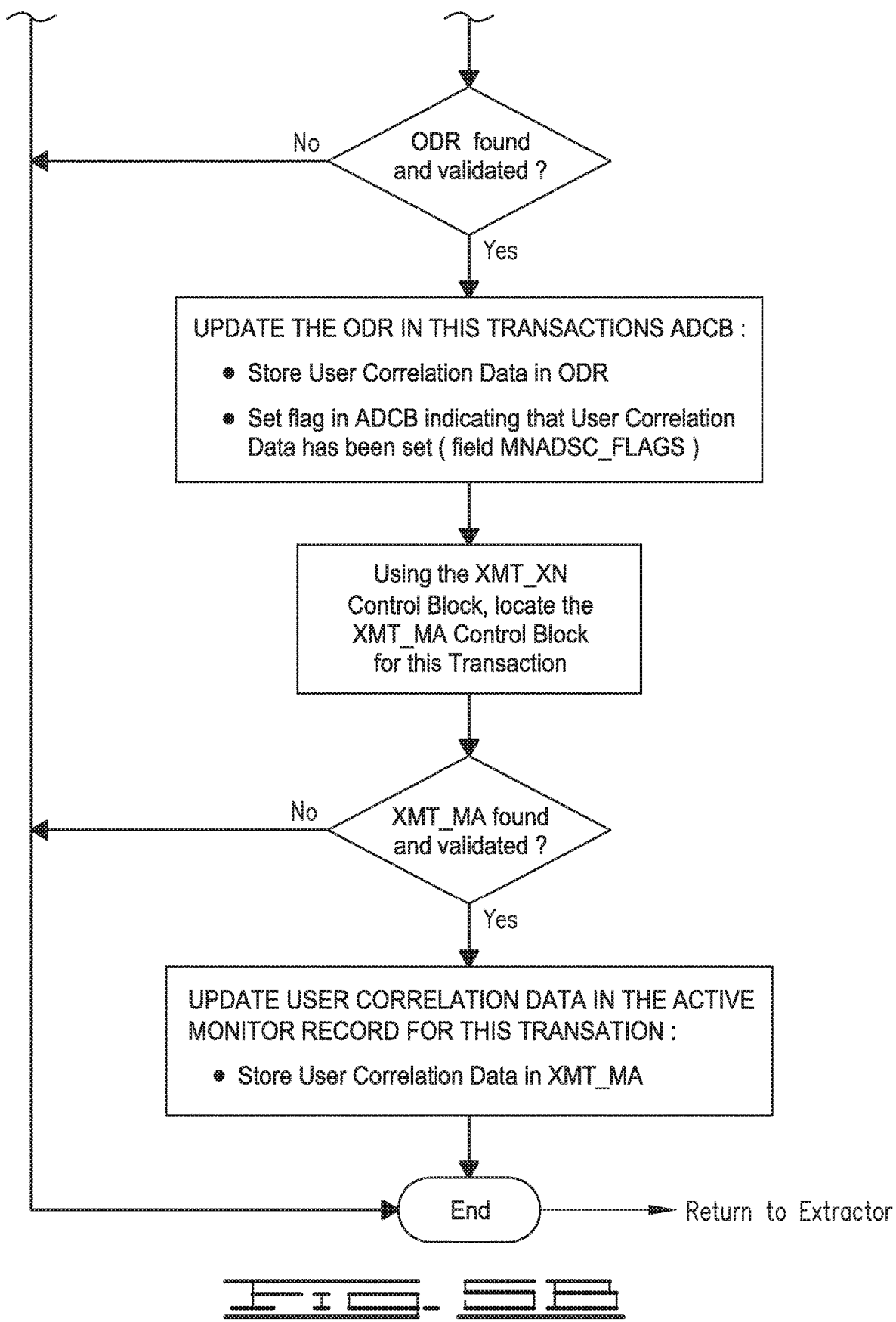

TRANSACTION TRACKING

CROSS REFERENCE TO RELATED APPLICATIONS

This Application claims priority and incorporates fully the disclosure of U.S. Provisional Application Ser. No. 62/598,872, filed Dec. 14, 2017, titled "Transaction Tracking".

BACKGROUND

Electronic consumer transactions commonly begin on personal computers or hand held electronic devices such as smart phones and tablets. Such transactions typically originate as a HTTP request (HTTP=Hypertext Transfer Protocol) sent to an application server as the first point of contact. That application server may rely upon other application servers to fulfill the request. Application servers play the role of both "Client" and "Server" as they exchange HTTP Requests and Responses in order to satisfy the original request.

In many industries and for many decades, IBM Mainframes have played a critical role as the system of record for transaction processing. IBM's CICS software, a mixed language application server and transaction processor, is a popular environment for executing transactional applications on a Mainframe. Traditionally, requests are sent by an application server to CICS via the CICS Transaction Gateway (CTG). Increasingly, requests are sent to CICS using HTTP. Requests can also be sent to CICS through the agency of other software running on the Mainframe. And, in such cases, they are processed by CICS as an EXCI request. CTG and EXCI Requests are processed by CICS in a similar fashion.

Modern networking infrastructure components and application servers that handle HTTP based requests, typically allow Request Correlation Data to be carried with the HTTP Requests and Responses via an HTTP Header. The source of the Request Correlation Data might be the originating device, the networking components, or the application server(s). Which component creates the Request Correlation Data varies based on the technology or operational choices made by a business enterprise. Thus, Request Correlation Data is frequently carried by HTTP Requests that are ultimately sent to the Mainframe. If an application server communicates to CICS using either CTG or EXCI, Request Correlation Data could also be included in the data sent to the mainframe.

Unfortunately, CICS does not provide support for extracting Request Correlation Data received with an HTTP, CTG or EXCI request and associating it with the CICS transaction(s). For example, even though HTTP requests commonly carry Request Correlation Data in an HTTP Header, CICS does not provide a means whereby that information can be extracted from the HTTP request and associates with the CICS transaction(s) executed.

For a wide variety of purposes, including security, system management and customer satisfaction, organizations that rely on IBM Mainframes will benefit from a system and method which allows Request Correlation Data, generated by the originating device or an intermediate networking device or application server, to be associated with the CICS transaction(s) executed to fulfill a given request. Such end-to-end transaction tracking will create a more secure and manageable environment for organizations that use IBM Mainframes as an integral part of their business strategy. Additionally, to ensure rapid adaption of the end-to-end transaction tracking, the system must provide this functionality without requiring modification of the software systems currently operating within the Mainframe environment.

SUMMARY

Disclosed herein is a computer-implemented method for tracking a consumer transaction from a non-mainframe environment into a Customer Information Control System (CICS) mainframe environment. The method includes the steps of:

receiving a transaction request from a non-mainframe application server over a network;

detecting the arrival of a transaction request from a non-mainframe application server over a network via a Listener process;

initiating the execution of an Initial User Task (IUT) to oversee the execution of an Initial User Program (IUP);

transferring control to an Extractor process, which is defined to CICS as a Task Related User Exit (TRUE) that is to be given control when any task starts (CICS Start of Task TRUE), wherein the extraction step occurs after the initiation of the IUT but prior to the IUT initiating execution of the IUP;

wherein the extraction step includes:
  determining if the transaction request is an HTTP request, if the transaction request is an HTTP request then checking the Program Name and Transaction ID associated with the request against a database containing Program Names and Transaction IDs associated with HTTP requests;
  determining if the transaction request includes Request Correlation Data (RCD), wherein the HTTP Headers associated with the request are checked against a database containing HTTP Header Names that can carry RCD, based upon the request being an HTTP request;
  extracting the RCD from the transaction request, based upon the request including RCD;

initiating the execution of an IUT Annotator process;
transferring control to CICS for completion of the transaction, wherein the transference step occurs after completion of the annotation step;

wherein the annotation step includes:
  identifying the XMT_XN control block associated with the transaction;
  using the XMT_XN control block to locate the Association Data Control Block (ADCB) associated with the transaction;
  locating the Origin Data Record (ODR) within the ADCB;
  validating the ODR;
  updating the ODR by annotating the RCD associated with the transaction;
  setting the ODR Update Flag indicating that the ODR has been updated with the RCD;
  using the XMT_XN control block to locate the XMT_MA control block associated with the transaction;
  updating the XMT_MA control block by annotating the RCD associated with the transaction;
  returning control to the Extractor process;

completing the consumer transaction within the CICS mainframe environment, wherein the completion step occurs after completion of the extraction and annotation steps.

Disclosed herein is a computer-implemented method for tracking a consumer transaction from a non-mainframe environment into a Customer Information Control System (CICS) mainframe environment. The method includes the steps of:

receiving a transaction request in the form of a Hypertext Transfer Protocol (HTTP) request from a non-mainframe application server over a network;

detecting the arrival of a transaction request from a non-mainframe application server over a network via an HTTP Listener process;

initiating the execution of an Initial User Task (IUT) to oversee the execution of an Initial User Program (IUP);

transferring control to an HTTP Extractor process, which is defined to CICS as a Task Related User Exit (TRUE) that is to be given control when any task starts (CICS Start of Task TRUE), wherein the extraction step occurs after the initiation of the IUT but prior to the IUT initiating execution of the IUP;

wherein the extraction step includes:

determining if the transaction request is an HTTP request, wherein the Program Name and Transaction ID associated with the request are checked against a database containing Program Names and Transaction IDs associated with HTTP requests;

determining if the transaction request includes Request Correlation Data (RCD), wherein the HTTP Headers associated with the request are checked against a database containing HTTP Header Names that can carry RCD, based upon the request being an HTTP request;

extracting the RCD from the transaction request, based upon the request including RCD;

initiating the execution of an IUT Annotator process;

transferring control to CICS for completion of the transaction, wherein the transference step occurs after completion of the annotation step;

wherein the annotation step includes:

identifying the XMT_XN control block associated with the transaction;

using the XMT_XN control block to locate the Association Data Control Block (ADCB) associated with the transaction;

locating the Origin Data Record (ODR) within the ADCB;

validating the ODR;

updating the ODR by annotating the RCD associated with the transaction;

setting the ODR Update Flag indicating that the ODR has been updated with the RCD;

using the XMT_XN control block to locate the XMT_MA control block associated with the transaction;

updating the XMT_MA control block by annotating the RCD associated with the transaction;

returning control to the HTTP Extractor process;

completing the consumer transaction within the CICS mainframe environment, wherein the completion step occurs after completion of the extraction and annotation steps.

Disclosed herein is a method for tracking a consumer transaction from a non-mainframe environment into a Customer Information Control System (CICS) mainframe environment. The method includes the steps of:

receiving a transaction request from a non-mainframe application server over a network or from a client program within the mainframe environment, said transaction request being in the form of either a CICS Transaction Gateway (CTG) from a non-mainframe application over a network or an External CICS Transaction Gateway (CTG) request from a client program within the mainframe environment;

detecting the arrival of a transaction via a Listener process;

initiating the execution of an Initial User Task (IUT) to oversee the execution of an Initial User Program (IUP);

triggering a CICS Event Processing Rule when the IUT attempts to transfer control to the IUP that conveys control to a CTG/EXCI Extractor process when Request Correlation Data (RCD) is contained the COMMAREA or Container associated with the request;

wherein the extraction step includes:

determining if the transaction request includes RCD, wherein the Container Names associated with the request are checked against a database containing Container Names that can carry RCD, based upon the request being either a CTG request or an EXCI request;

extracting the RCD from the transaction request;

initiating the execution of an IUT Annotator process;

transferring control to CICS for completion of the transaction, wherein the transference step occurs after completion of the annotation step;

wherein the annotation step includes:

identifying the XMT_XN control block associated with the transaction;

using the XMT_XN control block to locate the Association Data Control Block (ADCB) associated with the transaction;

locating the Origin Data Record (ODR) within the ADCB;

validating the ODR;

updating the ODR by annotating the RCD associated with the transaction;

setting the ODR Update Flag indicating that the ODR has been updated with the RCD;

using the XMT_XN control block to locate the XMT_MA control block associated with the transaction;

updating the XMT_MA control block by annotating the RCD associated with the transaction;

returning control to the CTG/EXCI Extractor process;

completing the consumer transaction within the CICS mainframe environment, wherein the completion step occurs after completion of the extraction and annotation steps.

Disclosed herein is a method for tracking a consumer transaction from a non-mainframe environment into a Customer Information Control System (CICS) mainframe environment. The method includes the steps of:

receiving a transaction request in the form of a CICS Transaction Gateway (CTG) request from a non-mainframe application server over a network or an External CICS Interface (EXCI) request from a client program within the mainframe environment;

detecting the arrival of a transaction via a CTG Listener process, based on the request being a CTG request;

detecting the arrival of a transaction request via an EXCI Listener process, based on the request being a being an EXCI request;

initiating the execution of an Initial User Task (IUT) to oversee the execution of an Initial User Program (IUP);

triggering a CICS Event Processing Rule when the IUT attempts to transfer control to the IUP that conveys control to a CTG/EXCI Extractor process when Request Correlation Data (RCD) is contained the COMMAREA or Container associated with the request;

wherein the extraction step includes:

determining if the transaction request includes RCD, wherein the Container Names associated with the request are checked against a database containing Container Names that can carry RCD, based upon the request being a CTG/EXCI request;

extracting the RCD from the transaction request;

initiating the execution of an IUT Annotator process;

transferring control to CICS for completion of the transaction, wherein the transference step occurs after completion of the annotation step;

wherein the annotation step includes:

identifying the XMT_XN control block associated with the transaction;

using the XMT_XN control block to locate the Association Data Control Block (ADCB) associated with the transaction;

locating the Origin Data Record (ODR) within the ADCB;

validating the ODR;

updating the ODR by annotating the RCD associated with the transaction;

setting the ODR Update Flag indicating that the ODR has been updated with the RCD;

using the XMT_XN control block to locate the XMT_MA control block associated with the transaction;

updating the XMT_MA control block by annotating the RCD associated with the transaction;

returning control to the CTG/EXCI Extractor process;

completing the consumer transaction within the CICS mainframe environment, wherein the completion step occurs after completion of the extraction and annotation steps.

Disclosed herein is a system for tracking a consumer transaction from a non-mainframe environment into a Customer Information Control System (CICS) mainframe environment. The disclosed system includes:

an end-user device configured to send a transaction request to a non-mainframe application server over a network;

a non-mainframe application server configured to process a transaction;

a Listener process configured to detect the arrival of a transaction request;

an Initial User Task (IUT) process configured to oversee the execution of an Initial User Program (IUP);

an first Extractor process, defined to CICS as a Task Related User Exit (TRUE) that is to be given control when any task starts (CICS Start of Task TRUE), configured to extract the Request Correlation Data (RCD) from the transaction request and initiate the execution of an IUT Annotator process before transferring control to CICS;

a second Extractor process, initiated by a CICS Event Processing Rule when the IUT attempts to transfer control to the IUP and RCD is contained the COMMAREA or Container associated with the request, configured to extract the RCD from the transaction request and initiate the execution of an IUT Annotator process before transferring control to CICS for completion of the transaction; and, an IUT Annotator process configured to locate and update the Origin Data Record (ODR) with the RCD before transferring control to the Extractor process suitable for the transaction type.

Disclosed herein is a system for tracking a consumer transaction from a non-mainframe environment into a Customer Information Control System (CICS) mainframe environment. The disclosed system includes: an end-user device configured to send a transaction request to a non-mainframe application server over a network;

a non-mainframe application server configured to process a transaction request in the form of a Hypertext Transfer Protocol (HTTP) request or a CICS Transaction Gateway (CTG) request;

a HTTP Listener process configured to detect the arrival of an HTTP transaction request from a non-mainframe application server over a network;

a CTG Listener process configured to detect the arrival of a CTG transaction request from a non-mainframe application server over a network;

an External CICS Interface (EXCI) Listener process configured to detect the arrival of an EXCI transaction request from a client program within the mainframe environment;

an Initial User Task (IUT) process configured to oversee the execution of an Initial User Program (IUP);

an HTTP Extractor process, defined to CICS as a Task Related User Exit (TRUE) that is to be given control when any task starts (CICS Start of Task TRUE), configured to extract the Request Correlation Data (RCD) from the transaction request and initiate the execution of an IUT Annotator process before transferring control to CICS;

a CTG/EXCI Extractor process, initiated by a CICS Event Processing Rule when the IUT attempts to transfer control to the IUP and RCD is contained the COMMAREA or Container associated with the request, configured to extract the RCD from the transaction request and initiate the execution of an IUT Annotator process before transferring control to CICS for completion of the transaction; and an IUT Annotator process configured to locate and update the Origin Data Record (ODR) with the RCD before transferring control to the Extractor process suitable for the transaction type.

BRIEF DESCRIPTION OF THE DRAWINGS

FIGS. 1A and 1B provide an overview of the system and method for performing end-to-end transaction tracking.

FIGS. 5A and 5B provide a flow chart of an IUT Annotator where the embodiment illustrated is of a subprogram called by either the HTTP Extractor or CTG/EXCI Extractor.

DETAILED DESCRIPTION

Figure 1A:
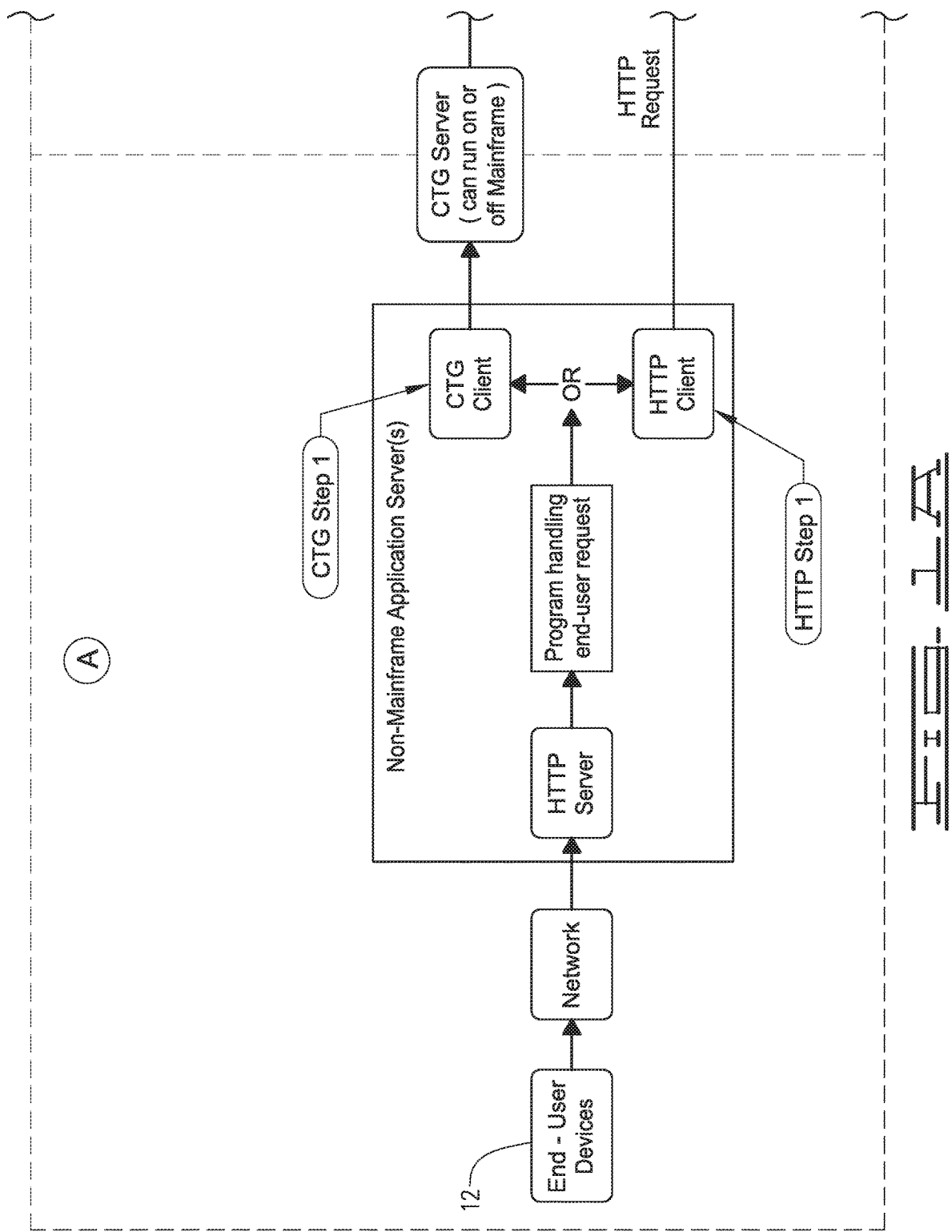

Defined terms used in the following description include:

IBM z Systems—IBM z Systems is the product family name used by IBM for all of its Mainframe computers.

Mainframe—For the purpose of this document, Mainframe is synonymous with an IBM z Systems computer.

CICS—Customer Information Control System (CICS) is a family of mixed language application servers that provide online transaction management and connectivity for applications on IBM Mainframe systems under z/OS and z/VSE.

CICS Region—A particular instance of CICS running on a Mainframe.

CICSPlex—A set of CICS Regions that are managed and manipulated as if they were a single entity.

CICS Transaction—A unit of processing consisting of one or more application programs, affecting one or more data objects, that is initiated by a single request.

CICS Task—A single instance of the execution of a transaction. While there is a technical difference between a CICS Transaction and a CICS Task, they are frequently used interchangeably.

CICS Transaction Tracking (CICS TT)—CICS Transaction Tracking is a collection of functionality, progressively added in more recent versions of CICS, that provides the capability to identify the relationships between tasks in an application as they flow across regions in a CICSplex. Transaction tracking provides a standard framework for the tracking and resolution of interrelated CICS transactions. One of the key roles of CICS Transaction Tracking is to ensure that the Initial User Task, and all subsequent User Tasks, are assigned a common Transaction Group ID. The intent of Transaction Tracking is to improve productivity, simplify system operation tasks, and perform problem determination within the CICS environment.

Initial User Task (IUT)—The first user ("non-system") CICS Task/Transaction that is executed upon receiving a request. This definition implies that there may be one or more "system" (non-user) Tasks/Transactions that handle a request up to the point when the Initial User Task is executed.

Initial User Program (IUP)—The first user ("non-system") program associated with the Initial User Task. Whereas the "Task" or "Transaction" represents the unit of work from an administrative standpoint, the "Program" is the executable code associated with the Task/Transaction.

Transaction Group—A set of associated transactions that are all assigned the same unique identifier of the originating transaction. Since one transaction can start others, the transaction group includes all transactions that were executed as a result of, and in association with, the Initial User Task.

Transaction Group ID—The common identifier assigned by CICS to all transactions within a Transaction Group.

Association Data—Association data is a set of information that describes the environment in which user tasks run and the way that user tasks are attached in a CICS region. Association data is built by CICS for each task when it starts and represents context information specific to the task itself. Association data also includes details about the origin of the task and the way it was started.

Association Data Control Block—The name of the area of storage that holds the Association Data for a user task.

Origin Data—Origin data is a section of Association Data that describes where the task was started (the point of origin).

Origin Data Record (ODR)—The name of the area of storage, within the ADCB, that holds the Origin Data.

ODR Update Flag—The concise name used to denote the Update ODR User Flag within the Origin Data Record.

Client Program (or Client)—A software program that sends a request to a server by way of a network.

CTG—IBM CICS Transaction Gateway is a software product that provides secure access to CICS from Java, Java EE, .NET Framework, C and C++ applications. CTG typically runs on a server outside the Mainframe environment, but can also run on the Mainframe.

CTG Client—A software program that uses CTG to send a request to CICS.

CTG Request—A request to run a CICS transaction or program that was sent to CICS by a CTG Client via CTG.

CTG Listener—The component(s) within CICS (provided as part of CICS) that detect the arrival of a CTG Request and instigates processing.

HTTP—The Hypertext Transfer Protocol (HTTP) is an application protocol for distributed, collaborative, and hypermedia information systems. HTTP is the foundation of data communication for the World Wide Web. HTTP functions as a request—response protocol in the client—server computing model. A web browser, for example, may be the client and an application running on a computer hosting a website may be the server. The client submits an HTTP request message to the server. The server performs functions on behalf of the client and returns a response message to the client.

HTTP Client—A software program that uses HTTP to send a request to an HTTP server. In the context of this document, the HTTP server is CICS.

HTTP Request—For the purpose of this document, a request to run a CICS transaction or program that was sent to CICS by an HTTP Client.

HTTP Listener—The components(s) within CICS (provided as part of CICS) that detect the arrival of a HTTP Request and instigates processing.

Out-of-Band Data—In the context of computer networking, an Out-of-Band communication mechanism provides a conceptually independent channel, between two endpoints, which allows any data sent via that mechanism to be kept separate from in-band data. The out-of-band data passing mechanism is provided as an inherent capability of the data channel and transmission protocol, rather than requiring a separate channel and endpoints to be established.

HTTP Header—HTTP Requests may contain HTTP Headers to convey Out-of-Band Data about the request or control how the request is to be processed. Information conveyed via HTTP Headers allows it to remain distinct from what would normally be considered the request and response messages that are exchanged between a client and server. HTTP Headers are used for a variety of purposes, including the conveyance of security credentials and the characteristics about the origin of the HTTP Request.

EXCI—The External CICS Interface is an application programming interface that enables a non-CICS program (acting as a client) running on a Mainframe to call a program (acting as a server) running in a CICS Region and to send and receive data using either: (a) a Communications Area, or (b) a Channel with one or more data Containers.

EXCI Client—A software program that uses EXCI to send a request to CICS.

EXCI Request—A request to run a CICS program that was sent to CICS by an EXCI Client.

EXCI Listener—The component(s) within CICS (provided as part of CICS) that detect the arrival of an EXCI Request and instigates processing.

Request Correlation Data (RCD)—One or more data items conveyed from a Client to a Server via a request. If both the client and server have the same Correlation Data, and if they include that Correlation Data in messages (or other artifacts) generated about their activities, then the processing activity of the Client and Server can subsequently be correlated to improve productivity, understand cause/effect relationships, simplify system operation tasks, and perform problem determination (across the client-server boundary). One of the most common methods to convey Request Correlation Data between a HTTP client and server is via a HTTP Header (e.g., X-Request-ID or X-Correlation-ID).

CICS Event Processing (CICS EP)—A feature of CICS that providing a noninvasive methodology for enhancing business applications. Events are defined and controlled independently of the business logic, extending a business application without modification.

Communication Area (COMMAREA)—A linear area of storage used to pass data between tasks, or between programs within a task. The size of a COMMAREA is limited to 31,767 bytes (32k−1).

Container—Containers are named blocks of data, designed for passing information between CICS programs. Programs can pass any number of containers between each other. Containers are grouped in sets that are called channels.

Channel—A Channel is a named set of Containers. A channel is analogous to a parameter list. Using Channels and Containers to pass data between programs is a more modern methodology than using COMMAREAs.

LINK—A program running under CICS can LINK to another program using an EXEC CICS LINK command. A LINK command is used to pass control from an application program at one logical level to an application program at the next lower logical level. LINKing from program A to program B is analogous to calling a subroutine: Program A is suspended while Program B executes. When Program B finishes, Program A will resume. In the above example, Program A may be referred to as the "LINKed from" program, and Program B may be referred to as the "LINKed to" program. Program A passes data to Program B using either a COMMAREA or a Channel (a named set of Containers).

START—A transaction running under CICS can START another transaction using an EXEC CICS START command. The new transaction, and the program associated with it, will run independently of the transaction and program that started it. If Transaction A STARTs Transaction B, Transaction A will resume execution as soon as CICS processes the START command. Transaction A may pass data to Transaction B through a variety of means, including the use of a COMMAREA or a Channel (a named set of Containers).

Task Related User Exit (TRUE)—Within CICS, a Task Related User Exit is a user-written program that is associated with specified events during the life of a task. When a TRUE is enabled with the TASKSTART option, the exit is invoked at the start of every task (a "Start of Task TRUE"). By default, the TRUE is also invoked at end of task, but the user-written program can disable this invocation if it is unnecessary. Use of TRUEs are well document by IBM.

Exit Programming Interface (XPI)—The user exit programming interface provides CICS exit programs with access to CICS services.

SMF—IBM System Management Facility (SMF) is a component of IBM's z/OS for Mainframe computers, providing a standardized method for writing out activity records to a file (or "data set" to use a z/OS term). SMF provides instrumentation of all baseline activities running on that IBM mainframe operating system, including I/O, network activity, software usage, error conditions, processor utilization, etc. SMF forms the basis for many monitoring and automation utilities.

SMF Record—An activity record written by SMF to a file. Each SMF record has a numbered type (e.g. "SMF 120" or "SMF 89"), and installations have great control over how much or how little SMF data to collect. Records written by software other than IBM products generally have a record type of 128 or higher. Some record types have subtypes—for example Type 70 Subtype 1 records are written by RMF to record CPU activity.

FIGS. 1A and 1B provides a high level over view of the systems and tasks disclosed herein. As depicted in FIGS. 1A and 1B, the method for end-to-end transaction tracking begins in a non-mainframe environment A and ends in a mainframe environment B. Starting from the left side of FIGS. 1A and 1B, a consumer operating an end-user device 12 inputs a transaction request. End-user device 12 utilizes a program or "app" to send the request to a server by way of a network, typically as an HTTP Request. Between end-user device 12 and the application server are various networking infrastructure components that handle the HTTP requests. These networking components may include routers, load balancers and firewalls. If Request Correlation Data was not included in the initial HTTP Request coming from end-user device 12, then it is common that Request Correlation Data will be generated by one of these networking components. Once generated, the Request Correlation Data is typically injected into the HTTP Request via an additional HTTP Header. If Request Correlation Data was not generated by the program running on the end-user's device, or by the networking infrastructure components, it can be generated and assigned by the application server that first receives the HTTP request for processing. Thus, the source, content and format of the Request Correlation Data will vary based on the technology or operational choices made by a business enterprise. Whatever its source, the Request Correlation Data is included as an HTTP Header that flows with all subsequent HTTP requests/responses, exchanged by clients and servers, in order to fulfill the initial end-user request.

Continuing from left to right in FIG. 1, the HTTP Request is processed by an application server. It, and all other components in the path between the end-user device and the application server, will typically have access to the Request Correlation Data.

If the fulfillment of the end-user's request involves business logic or data on a Mainframe, then the program running on the application server assumes the role of being a Client to the Mainframe. Thus, the program running on the application server is both a Server to the end-user's device, and a Client to the Mainframe. Various alternatives exist for how an application server can communicate to CICS running on the Mainframe. The two most common options are using CICS Transaction Gateway (CTG) or HTTP. Thus, in the application server box of FIG. 1, we denote that the processing program will be running as either a CTG Client or an HTTP Client with respect to its communication to the Mainframe.

When the program running on the application server uses HTTP to communicate to the Mainframe (i.e., it acts as a HTTP Client), it will typically forward the HTTP Headers it received with the request from the end-user device. Thus, if the application server received a Header that carries the Request Correlation Data, the conveyance of that Header with the Request Correlation Data to the Mainframe is usually automatic.

When the program running on the application server uses CTG to communicate to the Mainframe (i.e., it acts as a CTG Client), there is no standard way to convey Request Correlation Data as part of a CTG Request. The methodology outlined herein relies on transporting the Request Correlation Data in the COMMAREA or a named Container (the concepts of conveying data in COMMAREAs or Containers are defined by CICS) to the Mainframe.

Within the mainframe environment B, CICS Transaction Tracking (CICS TT) is a collection of functionality that provides the capability to identify related tasks/transactions in an application as they flow across regions in a CICSplex. Transaction tracking provides a standard framework for the tracking and resolution of interrelated CICS transactions. For example, CICS Transaction Tracking ensures that the Initial User Task, and all subsequent and related User Tasks, are assigned a common Transaction Group ID. CICS Transaction Tracking also propagates various elements of information, including Origin Data, across all transactions in the Group. Thus, Transaction Tracking provides a foundation for improving productivity, simplifying system operation tasks, and performing problem determination. However, Transaction Tracking does not provide any means whereby Request Correlation Data can be extracted from a CTG/EXCI or HTTP request, added to the Origin Data for the Initial User Task, and thus subsequently replicated to all transactions in the Group.

Assuming that the Request Correlation Data is conveyed to the CICS Mainframe as part of the CTG or HTTP request, the next step in the process utilizes an HTTP or CTG extractor function to extract the Request Correlation Data and add it to the Origin Data associated with the Initial User Task. The Initial User Task is the first user ("non-system") CICS Task that is executed upon receiving a request. This Task is the administrative entity managed by CICS to oversee the execution of the Initial User Program. Adding the Request Correlation Data to the Origin Data associated with the Initial User Task must be performed before the Initial User Program begins execution. Furthermore, these actions must happen transparently (without the knowledge of, or participation by, the Initial User Program).

Using the network, the HTTP or CTG request passes from the non-mainframe environment A to the mainframe environment B. EXCI requests are issued by a Client Program running on the Mainframe, and thus do not arrive over the network. Within the mainframe environment, a CICS Listener 14 detects the arrival of a transaction request from the Client Program. Listener 14 begins the processing steps within the mainframe environment B. Within the CICS environment, CTG and EXCI requests are processed similarly. HTTP requests are processed differently. The differences between HTTP requests and CTG/EXCI requests necessitate slightly different process steps to provide the desired end-to-end transaction tracking. A high-level overview of the end-to-end transaction tracking operation is provided below, followed by the specific details associated with HTTP and CTG/EXCI requests.

As defined above, CICS provides online transaction management and connectivity for applications on mainframe systems. The system depicted in FIGS. 1A and 1B, provides Mainframe customers with the ability to use CICS TT inside the mainframe environment B in a manner consistent with activity tracking outside the mainframe environment. By associating the Request Correlation Data with all CICS transactions executed to fulfill the original End-user's request, the business gains a true and complete end-to-end view.

Within the mainframe environment B, and in order to provide an effective solution, the act of adding the Request Correlation Data to the Origin Data associated with the Initial User Transaction (IUT) must occur prior to the Initial User Program (IUP) being executed. That's because once the IUP is running, it may process work in such a way that other transactions could be started. This would cause CICS TT to propagate the IUT's Origin Data to that new program or transaction. Thus, if the Request Correlation Data is not added to the Origin Data before the IUP starts, the Origin Data propagated to other transactions in the Transaction Group would be incomplete (i.e., it would not include the Request Correlation Data). In conventional systems, operational protocols do not permit association of the Request Correlation Data generated by the user's original transaction with the IUT. As a result, conventional systems cannot use CICS TT as the foundation for complete end-to-end transaction tracking.

In the system depicted by FIGS. 1A and 1B, Listener 14 acts as sentry. Upon receipt of a Request, Listener 14 initiates a sequence of events that ends up starting the IUT. Depending on whether the Request was a HTTP or CTG/EXCI request, control is passed to an Extractor 16 after the IUT is started, but before the IUP receives control.

Figure 4:
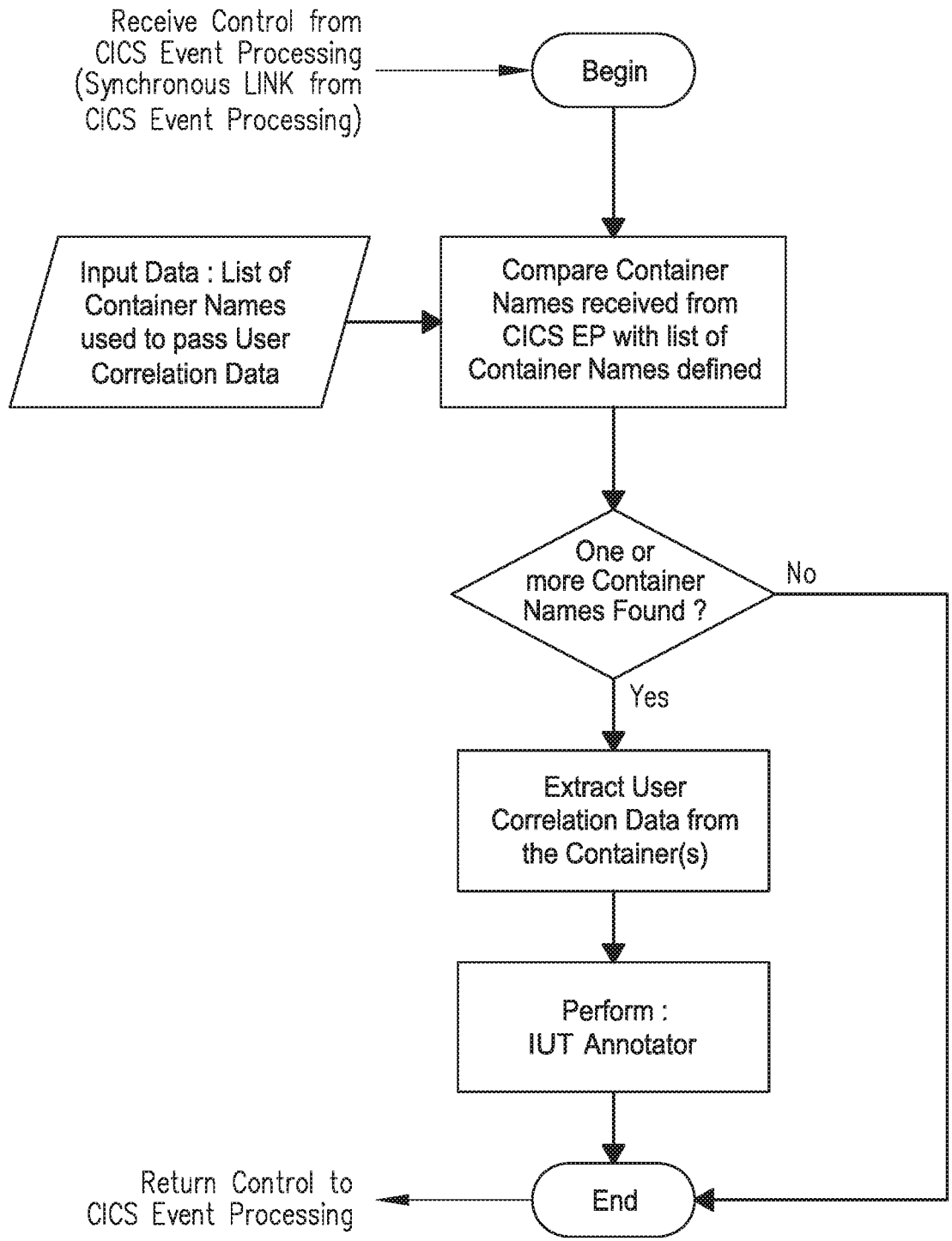
FIG. 4 provides a flow chart of a CTG/EXCI Extractor process.

Extractor 16 performs the tasks described by FIG. 4 and extracts Request Correlation Data from the transaction request, in a manner appropriate to the request type. In the system of FIGS. 1A and 1B, and regardless of the request type, Extractor 16 is invoked by CICS after creation of the IUT but prior to invoking the IUP. Thus, extraction of Request Correlation Data occurs in a brief window of time between CICS starting the IUT and the IUT subsequently invoking the IUP.

Extractor 16 inspects the digital data received with the transaction request and extracts the Request Correlation Data from one or more designated fields within the transaction request. After extracting the Request Correlation Data, Extractor 16 invokes the IUT Annotator 18. IUT Annotator 18 is the software component responsible for updating the Origin Data normally produced by CICS in the mainframe environment B for the IUT. In the updating step, IUT Annotator 18 incorporates the Request Correlation Data, as generated by (or on behalf of) the initial consumer transaction on end-user device 12 into the Origin Data managed by CICS TT. Thus, IUT annotator 18 performs the crucial step that allows CICS TT to be used for complete end-to-end tracking.

Following incorporation of the Request Correlation Data into the Origin Data associated with the IUT, CICS operates in a conventional manner. However, the Origin Data managed by CICS now includes Request Correlation Data provided from outside of the mainframe environment B. As a result, the CICS TT will automatically convey and replicate the annotated Origin Data to all transactions within the Transaction Group associated with the Initial User Transaction (IUT). Significantly, the improvements to the mainframe environment B depicted in FIGS. 1A and 1B and discussed herein do not require modification of any functional aspect of CICS or modification of any other software component within the mainframe environment B. Thus, the improvements provided herein are a drop-in modification that will provide enhanced security and tracking capabilities without modification of the original software systems.

Having described the present invention in at high level with reference to FIGS. 1A and 1B, the following discussion will provide additional details concerning the operational differences associated with Request Correlation Data received via HTTP and CTG/EXCI Requests.

Returning to the left side of FIGS. 1A and 1B, the following discussion will describe the method for end-to-end transaction tracking for transactions originating as an HTTP transaction request. As noted above, when a consumer initiates a transaction on an end-user device, the end-user device utilizes a Client Program to send the transaction request over a network to a server. In this instance, the Client Program utilizes HTTP to render the request in the non-mainframe environment A. Thus, the HTTP Client, the networking infrastructure or the application server generates the Request Correlation Data prior to the request entering the mainframe environment B.

Upon entering the mainframe environment B, CICS HTTP Listener 14A starts the IUT. The HTTP Extractor is defined to CICS as a Task Related User Exit (TRUE) that is to be given control when any task starts (this is referred to as a CICS Start of Task TRUE). Thus, at the point when the HTTP Extractor receives control, the IUP has not begun executing. Upon receiving control, the HTTP Extractor 20 initiates the HTTP Extractor's main process as provided in FIG. 2. Since the IUP has not begun execution, these process steps satisfy the requirement of associating Request Correlation Data from outside the mainframe environment A with Origin Data inside the mainframe environment B prior to initiation of the Initial User Program. HTTP Extractor 20 provides the ability to extract the Request Correlation Data from one or more of the HTTP headers generated by any component outside of the mainframe environment A. In the method disclosed in FIGS. 1-3, and because the HTTP Extractor is defined to CICS as Start of Task TRUE, the HTTP Extractor receives control following creation of the IUT but prior to initiation of the IUP.

Figure 2:
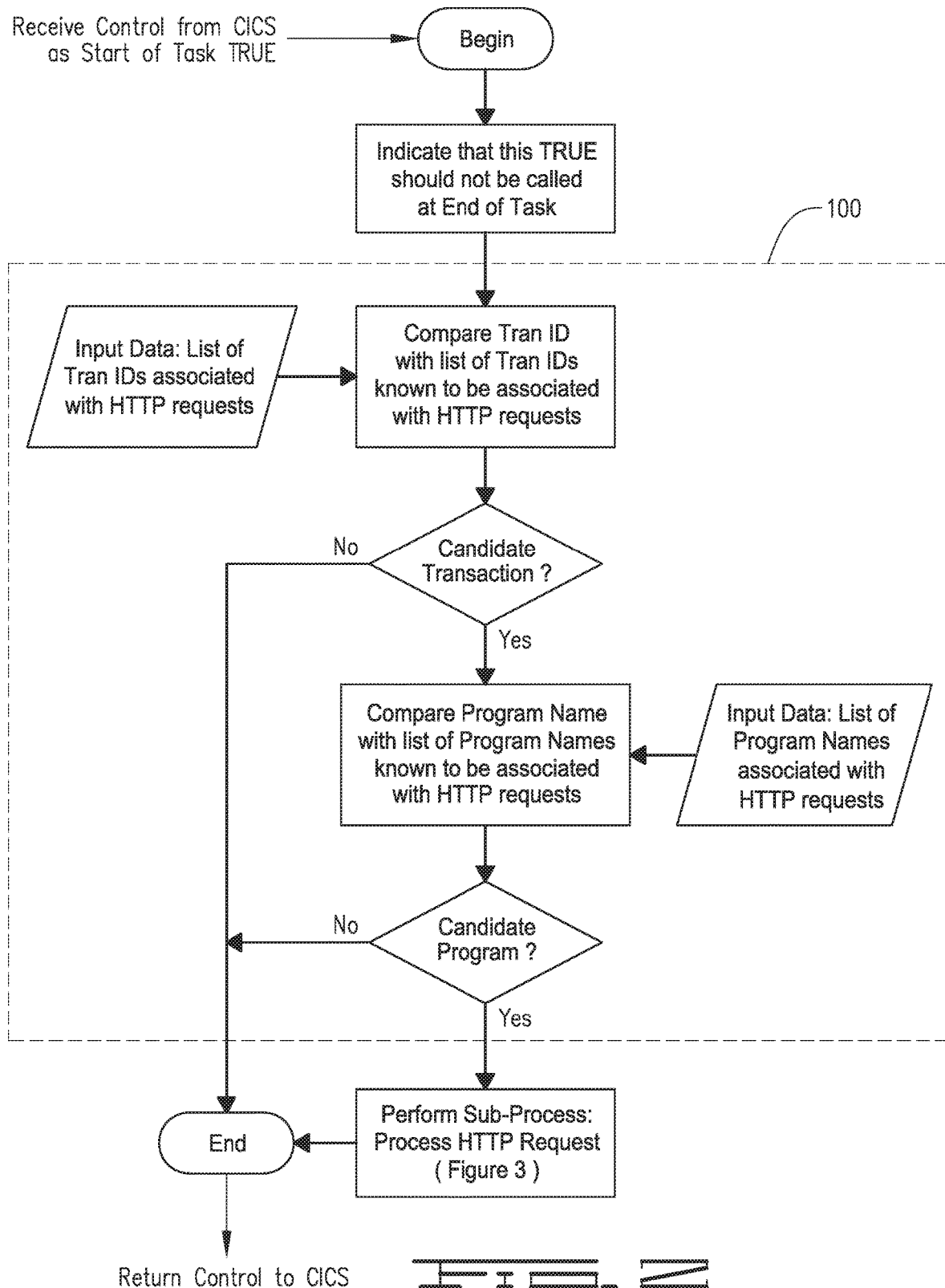
FIG. 2 provides a flow chart of the processes carried out by an HTTP Extractor where the embodiment illustrated is that of a CICS Task Related User Exit (TRUE).
Figure 3:
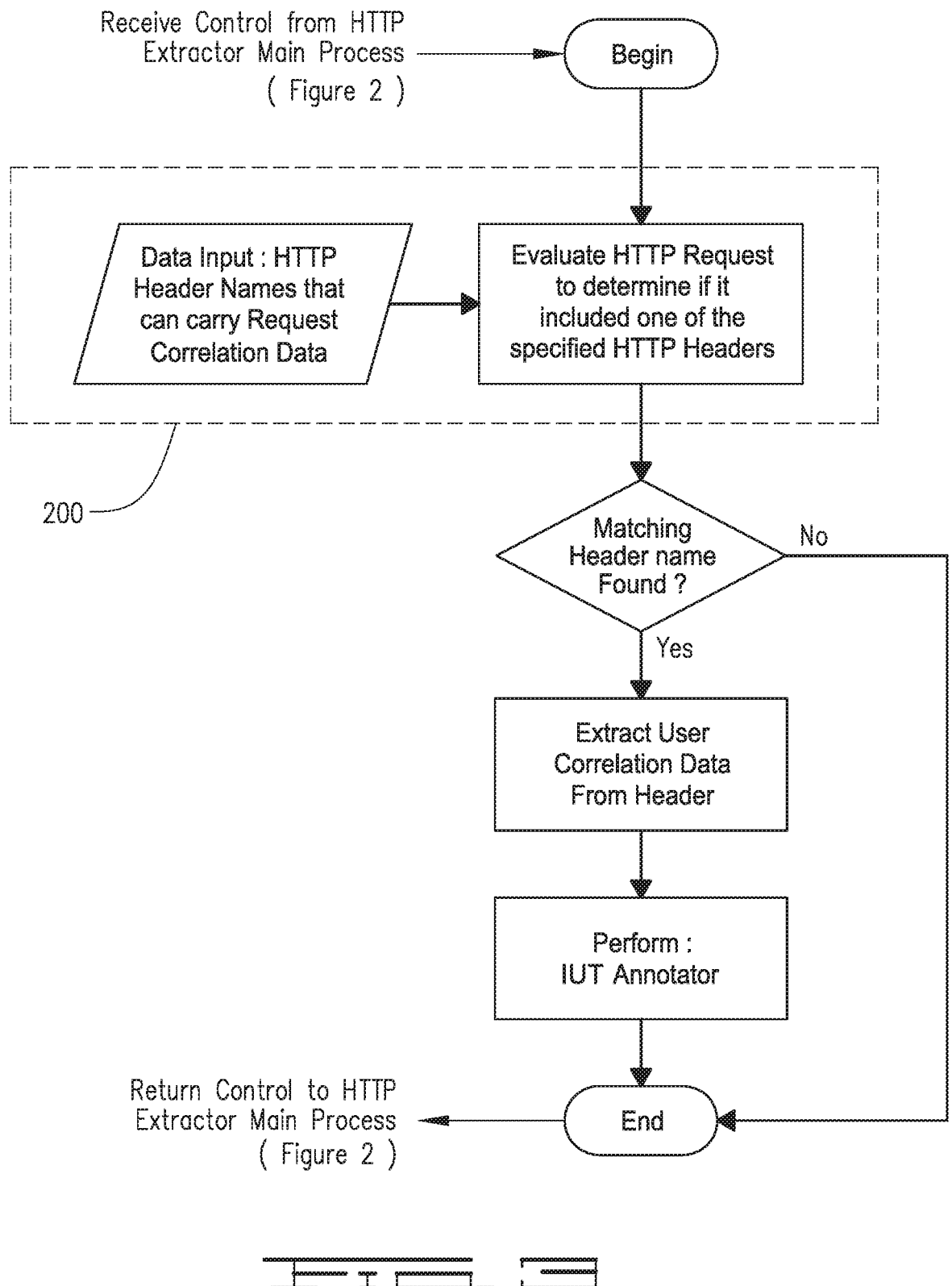
FIG. 3 provides a flow chart of the Sub-process of an HTTP request.

As depicted in FIG. 2, the main process of the HTTP Extractor receives control as a CICS Start of Task TRUE. The HTTP Extractor receives control each time CICS starts a new Transaction within the mainframe environment B. Therefore, the HTTP Extractor must efficiently decide whether the transaction being started does, in fact, stem from an HTTP Request. Thus, FIG. 2, Box 100 includes the step of providing a database of Program Names and Transaction IDs associated with HTTP requests. If the Program Name and/or Transaction ID correspond to a value in the database, then the HTTP Extractor will deem the transaction to be a HTTP request and is a candidate for further processing. Upon determination of suitability for further processing, the next step is to determine whether Request Correlation Data is being conveyed with the HTTP Request. Thus, FIG. 3, Box 200 includes the step of providing a database of HTTP Header Names that can carry Request Correlation Data. The HTTP Extractor evaluates the HTTP Headers received with the Request to determine if the Names for any of the received HTTP Heads correspond to a HTTP Header Name identified in the database. If the Transaction Request contains an HTTP Header Name corresponding to a HTTP Header Name identified in the database, then the value conveyed via that identified HTTP Header having that Name will be deemed to be the Request Correlation Data.

Figure 5A:
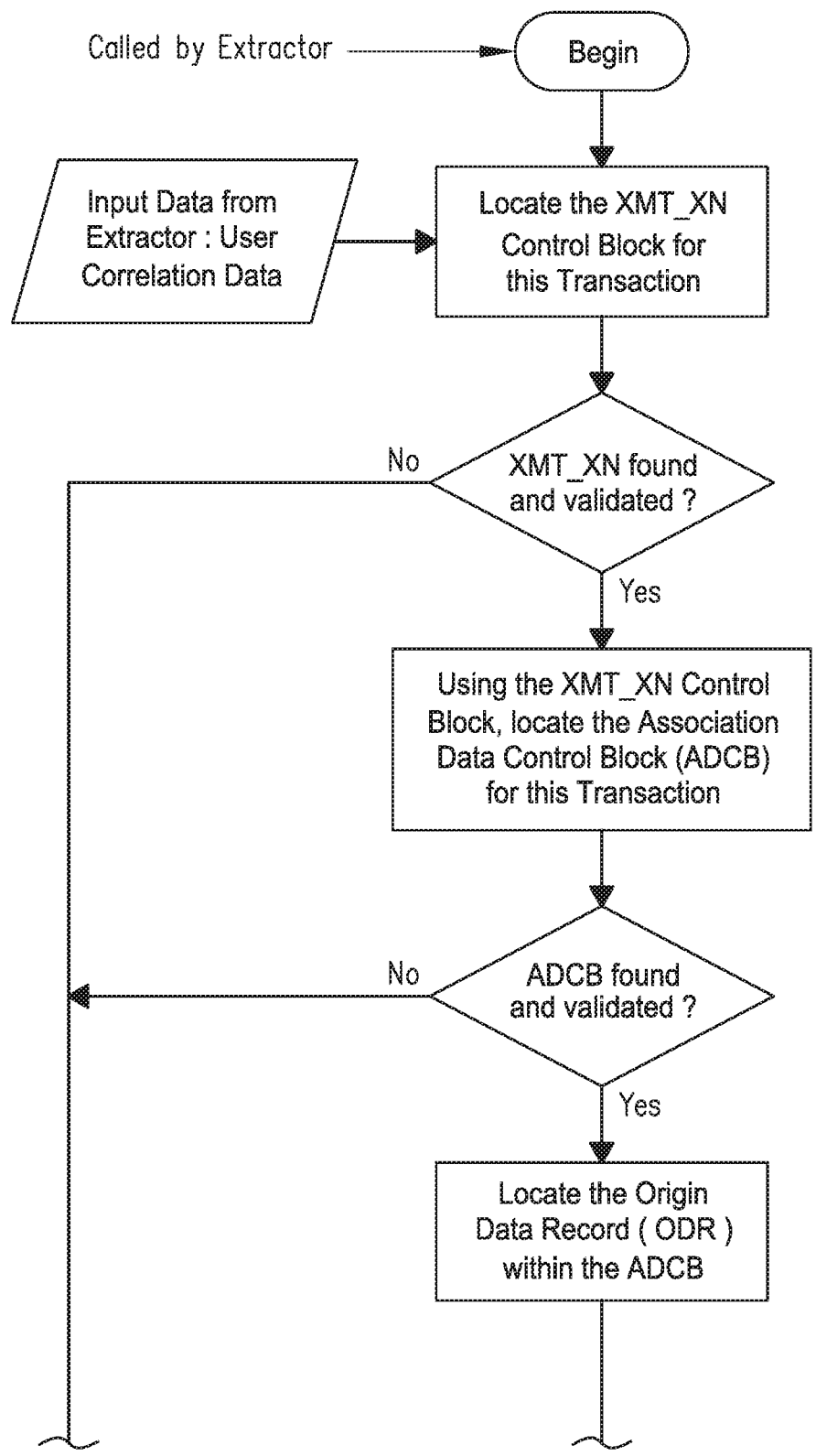

If Request Correlation Data has been extracted from the HTTP Request, the HTTP Extractor will invoke the IUT Annotator, i.e. initiation operation of the IUT Annotator. The flow diagram for the IUT Annotator is provided in FIGS. 5A and 5B and one suitable set of code for an IUT Annotator is provided in the appendix filed with this application. With reference to FIGS. 5A and 5B, the HTTP Extractor calls the IUT Annotator thereby initiating the annotation step. The annotation step managed by the IUT Annotator associates the Request Correlation Data with the Origin Data normally produced and managed by CICS, and the CICS Transaction Tracking component, within the mainframe environment B. The IUT Annotator updates fields in two specific data areas managed by CICS. In order to determine the location of these two control blocks, the program must traverse through other CICS control block areas. The process begins by locating the XMT_XM. CALLed programs are well documented by IBM and are not further illustrated.

With continued reference to FIGS. 5A and 5B, the IUT Annotator first identifies the data area or "control block" used by CICS for managing and monitoring the transaction. In FIGS. 5A and 5B, this data area is identified as XMT_XN. Upon validation of the XMT_XN data area, the IUT Annotator uses the XMT_XN data area to locate the Association Data Control Block (ADCB) for the Transaction. Following validation of the ADCB, Origin Data within the ADCB is located and validated. Following validation of the Origin Data Record within the ADCB, the IUT Annotator updates the Origin Data Record by adding to the record (i.e., annotating) the Request Correlation Data received with the HTTP Request. Additionally, the IUT Annotator sets the ODR Update Flag to indicate that the Origin Data has been updated with the Request Correlation Data. Following completion of the first annotation step and setting of the ODR Update Flag reflecting the same, the IUT Annotator uses the XMT_XN data area to locate another control block associated with the transaction. As reflected in FIGS. 5A and 5B, this control block is identified as the XMT_MA Control Block for the transaction. Upon validation of the XMT_MA Control Block, the IUT Annotator will complete the second annotation step by incorporating the Request Correlation Data in the record associated with the requested transaction. Upon completion of this final step, the IUT Annotator returns control of the process to the HTTP Extractor, which in turn transfers control to CICS for completion of the requested transaction. Thus, the implementation of the Listener, 14A, HTTP Extractor and IUT Annotator permit end-to-end incorporation of Request Correlation Data generated outside the mainframe environment A into and through the mainframe environment B.

Having described the operation of the current method with reference to CICS transactions initiated via HTTP Requests, the following discussion will describe a method for CICS transactions initiated by Client Programs using CTG protocol or EXCI protocol. Returning to the left side of FIGS. 1A and 1B, the following discussion will describe the method for end-to-end transaction tracking for transactions originating as an CTG or EXCI transaction request. As noted above, when a consumer initiates a transaction on an end-user device, the end-user device utilizes a Client Program to send the transaction request over a network to an application server. In this description of the method, the application server may utilize CTG or EXCI to convey the request to the mainframe environment B. The Client Program, the networking infrastructure or the application server generates the Request Correlation Data prior to the request entering the mainframe environment B. The Request Correlation Data is conveyed to the mainframe environment in a manner that is appropriate for CTG or EXCI Requests. Specifically, the Request Correlation Data will be conveyed within the COMMAREA or a Data Container.

Upon entering the mainframe environment B, Listener 14B or 14C may embody the function of the IUT, or may start the IUT as a separate transaction (depending on other factors). When the IUT attempts to pass control to the IUP, it triggers a CICS Event Processing Rule. The CICS Event Processing Rule conveys control to the CTG/EXCI Extractor 30. In accordance with the CICS Event Processing Rule the CTG/EXCI Extractor will only be invoked when Request Correlation Data is contained in the COMMAREA or Container associated with the CTG/EXCI Request. If the CICS Event Processing Rule is satisfied and the CTG/EXCI Extractor is invoked, the Extractor's main process as provided in FIG. 4 is executed. These process steps satisfy the requirement of associating Request Correlation Data from outside the mainframe environment A with Origin Data inside the mainframe environment B prior to initiation of the Initial User Program. CTG/EXCI Extractor 30 provides the ability to extract the Request Correlation Data from a CTG or EXCI Request. In the method disclosed in FIGS. 1 and 4, CTG/EXCI Extractor 30 is defined to CICS in a manner that instructs CICS to invoke the CTG/EXCI Extractor prior to initiation of the IUP.

FIG. 4 provides a flow chart of the CTG/EXCI Extractor operations. In FIG. 4, the CTG/EXCI Extractor 30 is LINKed to by CICS as the result of a predefined CICS Event Processing Rule having been satisfied. The event definition specifies the criteria the must be satisfied to trigger the event, as well as the action to be taken, e.g. calling the Event Extractor. The CICS Event Processing passes to this program a set of data Containers in a Channel. LINKed to programs are well documented by IBM and thus not illustrated in FIG. 4.

Other embodiments of the present invention will be apparent to one skilled in the art. As such, the foregoing description merely enables and describes the general uses and methods of the present invention. Accordingly, the following claims define the true scope of the present invention.

What is claimed is:

1. A computer-implemented method for tracking a consumer transaction from a non-mainframe environment into a Customer Information Control System (CICS) mainframe environment comprising:
    receiving a transaction request from a non-mainframe application server over a network;
    detecting the arrival of a transaction request from a non-mainframe application server over a network via a Listener process;
    initiating the execution of an Initial User Task (IUT) to oversee the execution of an Initial User Program (IUP);
    transferring control to an Extractor process, which is defined to CICS as a Task Related User Exit (TRUE) that is to be given control when any task starts (CICS Start of Task TRUE), wherein the extraction step occurs after the initiation of the IUT but prior to the IUT initiating execution of the IUP;
    wherein the extraction step includes:
        determining if the transaction request is an HTTP request, if the transaction request is an HTTP request then checking the Program Name and Transaction ID associated with the request against a database containing Program Names and Transaction IDs associated with HTTP requests;
        determining if the transaction request includes Request Correlation Data (RCD), wherein the HTTP Headers associated with the request are checked against a database containing HTTP Header Names that can carry RCD, based upon the request being an HTTP request;
        extracting the RCD from the transaction request, based upon the request including RCD;
        initiating the execution of an IUT Annotator process;
        transferring control to CICS for completion of the transaction, wherein the transference step occurs after completion of the annotation step;
    wherein the annotation step includes:
        identifying the XMT_XN control block associated with the transaction;
        using the XMT_XN control block to locate the Association Data Control Block (ADCB) associated with the transaction;
        locating the Origin Data Record (ODR) within the ADCB;
        validating the ODR;
        updating the ODR by annotating the RCD associated with the transaction;
        setting the ODR Update Flag indicating that the ODR has been updated with the RCD;
        using the XMT_XN control block to locate the XMT_MA control block associated with the transaction;
        updating the XMT_MA control block by annotating the RCD associated with the transaction;
        returning control to the Extractor process;
    completing the consumer transaction within the CICS mainframe environment, wherein the completion step occurs after completion of the extraction and annotation steps.

2. The method of claim 1, wherein the transaction request is in the form of a Hypertext Transfer Protocol request.

3. The method of claim 1, wherein in the step of transferring control to an Extractor Process, the Extractor Process is an HTTP Extractor Process.

4. A computer-implemented method for tracking a consumer transaction from a non-mainframe environment into a Customer Information Control System (CICS) mainframe environment comprising:
    receiving a transaction request in the form of a Hypertext Transfer Protocol (HTTP) request from a non-mainframe application server over a network;
    detecting the arrival of a transaction request from a non-mainframe application server over a network via an HTTP Listener process;
    initiating the execution of an Initial User Task (IUT) to oversee the execution of an Initial User Program (IUP);
    transferring control to an HTTP Extractor process, which is defined to CICS as a Task Related User Exit (TRUE) that is to be given control when any task starts (CICS Start of Task TRUE), wherein the extraction step occurs after the initiation of the IUT but prior to the IUT initiating execution of the IUP;
    wherein the extraction step includes:
        determining if the transaction request is an HTTP request, wherein the Program Name and Transaction ID associated with the request are checked against a database containing Program Names and Transaction IDs associated with HTTP requests;
        determining if the transaction request includes Request Correlation Data (RCD), wherein the HTTP Headers associated with the request are checked against a database containing HTTP Header Names that can carry RCD, based upon the request being an HTTP request;
        extracting the RCD from the transaction request, based upon the request including RCD;
        initiating the execution of an IUT Annotator process;
        transferring control to CICS for completion of the transaction, wherein the transference step occurs after completion of the annotation step;
    wherein the annotation step includes:
        identifying the XMT_XN control block associated with the transaction;
        using the XMT_XN control block to locate the Association Data Control Block (ADCB) associated with the transaction;

locating the Origin Data Record (ODR) within the ADCB;
validating the ODR;
updating the ODR by annotating the RCD associated with the transaction;
setting the ODR Update Flag indicating that the ODR has been updated with the RCD;
using the XMT_XN control block to locate the XMT_MA control block associated with the transaction;
updating the XMT_MA control block by annotating the RCD associated with the transaction;
returning control to the HTTP Extractor process;
completing the consumer transaction within the CICS mainframe environment, wherein the completion step occurs after completion of the extraction and annotation steps.

5. A computer-implemented method for tracking a consumer transaction from a non-mainframe environment into a Customer Information Control System (CICS) mainframe environment comprising:
receiving a transaction request from a non-mainframe application server over a network or from a client program within the mainframe environment, said transaction request being in the form of either a CICS Transaction Gateway (CTG) from a non-mainframe application over a network or an External CICS Transaction Gateway (CTG) request from a client program within the mainframe environment;
detecting the arrival of a transaction via a Listener process;
initiating the execution of an Initial User Task (IUT) to oversee the execution of an Initial User Program (IUP);
triggering a CICS Event Processing Rule when the IUT attempts to transfer control to the IUP that conveys control to a CTG/EXCI Extractor process when Request Correlation Data (RCD) is contained the COMMAREA or Container associated with the request;
wherein the extraction step includes:
determining if the transaction request includes RCD, wherein the Container Names associated with the request are checked against a database containing Container Names that can carry RCD, based upon the request being either a CTG request or an EXCI request;
extracting the RCD from the transaction request;
initiating the execution of an IUT Annotator process;
transferring control to CICS for completion of the transaction, wherein the transference step occurs after completion of the annotation step;
wherein the annotation step includes:
identifying the XMT_XN control block associated with the transaction;
using the XMT_XN control block to locate the Association Data Control Block (ADCB) associated with the transaction;
locating the Origin Data Record (ODR) within the ADCB;
validating the ODR;
updating the ODR by annotating the RCD associated with the transaction;
setting the ODR Update Flag indicating that the ODR has been updated with the RCD;
using the XMT_XN control block to locate the XMT_MA control block associated with the transaction;
updating the XMT_MA control block by annotating the RCD associated with the transaction;
returning control to the CTG/EXCI Extractor process;
completing the consumer transaction within the CICS mainframe environment, wherein the completion step occurs after completion of the extraction and annotation steps.

6. The method of claim 5, wherein the transaction request is in the form of a CICS Transaction Gateway (CTG) request from a non-mainframe application over a network.

7. The method of claim 6, wherein the step of detecting the arrival of the transaction via a Listener process utilizes a CTG Listener process when the request is a CTG request.

8. The method of claim 5, wherein the transaction request is in the form of an External CICS Transaction Gateway (CTG) request from a client program within the mainframe environment.

9. The method of claim 8, wherein the step of detecting the arrival of the transaction via a Listener process utilizes an EXCI Listener process.

10. A computer-implemented method for tracking a consumer transaction from a non-mainframe environment into a Customer Information Control System (CICS) mainframe environment comprising:
receiving a transaction request in the form of a CICS Transaction Gateway (CTG) request from a non-mainframe application server over a network or an External CICS Interface (EXCI) request from a client program within the mainframe environment;
detecting the arrival of a transaction via a CTG Listener process, based on the request being a CTG request;
detecting the arrival of a transaction request via an EXCI Listener process, based on the request being a being an EXCI request;
initiating the execution of an Initial User Task (IUT) to oversee the execution of an Initial User Program (IUP);
triggering a CICS Event Processing Rule when the IUT attempts to transfer control to the IUP that conveys control to a CTG/EXCI Extractor process when Request Correlation Data (RCD) is contained the COMMAREA or Container associated with the request;
wherein the extraction step includes:
determining if the transaction request includes RCD, wherein the Container Names associated with the request are checked against a database containing Container Names that can carry RCD, based upon the request being a CTG/EXCI request;
extracting the RCD from the transaction request;
initiating the execution of an IUT Annotator process;
transferring control to CICS for completion of the transaction, wherein the transference step occurs after completion of the annotation step;
wherein the annotation step includes:
identifying the XMT_XN control block associated with the transaction;
using the XMT_XN control block to locate the Association Data Control Block (ADCB) associated with the transaction;
locating the Origin Data Record (ODR) within the ADCB;
validating the ODR;
updating the ODR by annotating the RCD associated with the transaction;
setting the ODR Update Flag indicating that the ODR has been updated with the RCD;

using the XMT_XN control block to locate the XMT_MA control block associated with the transaction;

updating the XMT_MA control block by annotating the RCD associated with the transaction;

returning control to the CTG/EXCI Extractor process;

completing the consumer transaction within the CICS mainframe environment, wherein the completion step occurs after completion of the extraction and annotation steps.

11. A system for tracking a consumer transaction from a non-mainframe environment into a Customer Information Control System (CICS) mainframe environment comprising:

an end-user device configured to send a transaction request to a non-mainframe application server over a network;

a non-mainframe application server configured to process a transaction;

a Listener process configured to detect the arrival of a transaction request;

an Initial User Task (IUT) process configured to oversee the execution of an Initial User Program (IUP);

an first Extractor process, defined to CICS as a Task Related User Exit (TRUE) that is to be given control when any task starts (CICS Start of Task TRUE), configured to extract the Request Correlation Data (RCD) from the transaction request and initiate the execution of an IUT Annotator process before transferring control to CICS;

a second Extractor process, initiated by a CICS Event Processing Rule when the IUT attempts to transfer control to the IUP and RCD is contained the COMMAREA or Container associated with the request, configured to extract the RCD from the transaction request and initiate the execution of an IUT Annotator process before transferring control to CICS for completion of the transaction; and an IUT Annotator process configured to locate and update the Origin Data Record (ODR) with the RCD before transferring control to the Extractor process suitable for the transaction type.

12. The system of claim 11, wherein the non-mainframe application server is configured to process transaction requests in that are in the form of a Hypertext Transfer Protocol (HTTP) request or a CICS Transaction Gateway (CTG) request.

13. The system of claim 11, wherein said listener is a HTTP Listener process configured to detect the arrival of an HTTP transaction request from a non-mainframe application server over a network.

14. The system of claim 11, wherein said listener is a CTG Listener process configured to detect the arrival of a CTG transaction request from a non-mainframe application server over a network.

15. The system of claim 11, wherein said listener is an External CICS Interface (EXCI) Listener process configured to detect the arrival of an EXCI transaction request from a client program within the mainframe environment.

16. The system of claim 12, wherein said system includes a first listener in the configured as a HTTP Listener process configured to detect the arrival of an HTTP transaction request from a non-mainframe application server over a network, a second listener configured as a CTG Listener process configured to detect the arrival of a CTG transaction request from a non-mainframe application server over a network, and a third listener configured as an External CICS Interface (EXCI) Listener process configured to detect the arrival of an EXCI transaction request from a client program within the mainframe environment.

17. The system of claim 11, wherein said first Extractor process is an HTTP Extractor process.

18. The system of claim 11, wherein said second Extractor process is a CTG/EXCI Extractor process.

19. A system for tracking a consumer transaction from a non-mainframe environment into a Customer Information Control System (CICS) mainframe environment comprising:

an end-user device configured to send a transaction request to a non-mainframe application server over a network;

a non-mainframe application server configured to process a transaction request in the form of a Hypertext Transfer Protocol (HTTP) request or a CICS Transaction Gateway (CTG) request;

a HTTP Listener process configured to detect the arrival of an HTTP transaction request from a non-mainframe application server over a network;

a CTG Listener process configured to detect the arrival of a CTG transaction request from a non-mainframe application server over a network;

an External CICS Interface (EXCI) Listener process configured to detect the arrival of an EXCI transaction request from a client program within the mainframe environment;

an Initial User Task (IUT) process configured to oversee the execution of an Initial User Program (IUP);

an HTTP Extractor process, defined to CICS as a Task Related User Exit (TRUE) that is to be given control when any task starts (CICS Start of Task TRUE), configured to extract the Request Correlation Data (RCD) from the transaction request and initiate the execution of an IUT Annotator process before transferring control to CICS;

a CTG/EXCI Extractor process, initiated by a CICS Event Processing Rule when the IUT attempts to transfer control to the IUP and RCD is contained the COMMAREA or Container associated with the request, configured to extract the RCD from the transaction request and initiate the execution of an IUT Annotator process before transferring control to CICS for completion of the transaction; and an IUT Annotator process configured to locate and update the Origin Data Record (ODR) with the RCD before transferring control to the Extractor process suitable for the transaction type.

* * * * *